Feb. 20, 1968  E. R. BREAULT  3,369,682
CARGO HANDLING AND TRANSPORTING VEHICLE
Filed July 6, 1965  4 Sheets-Sheet 1

INVENTOR.
ERNEST R. BREAULT
BY Beehler & Arant
ATTORNEYS.

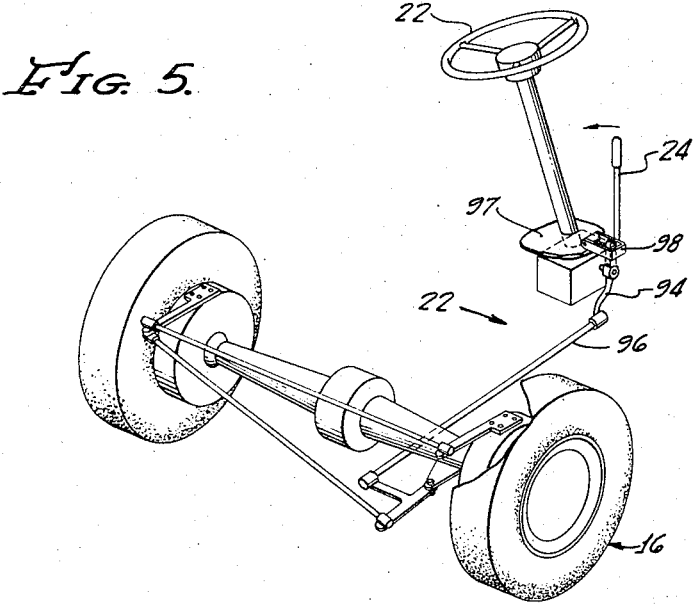

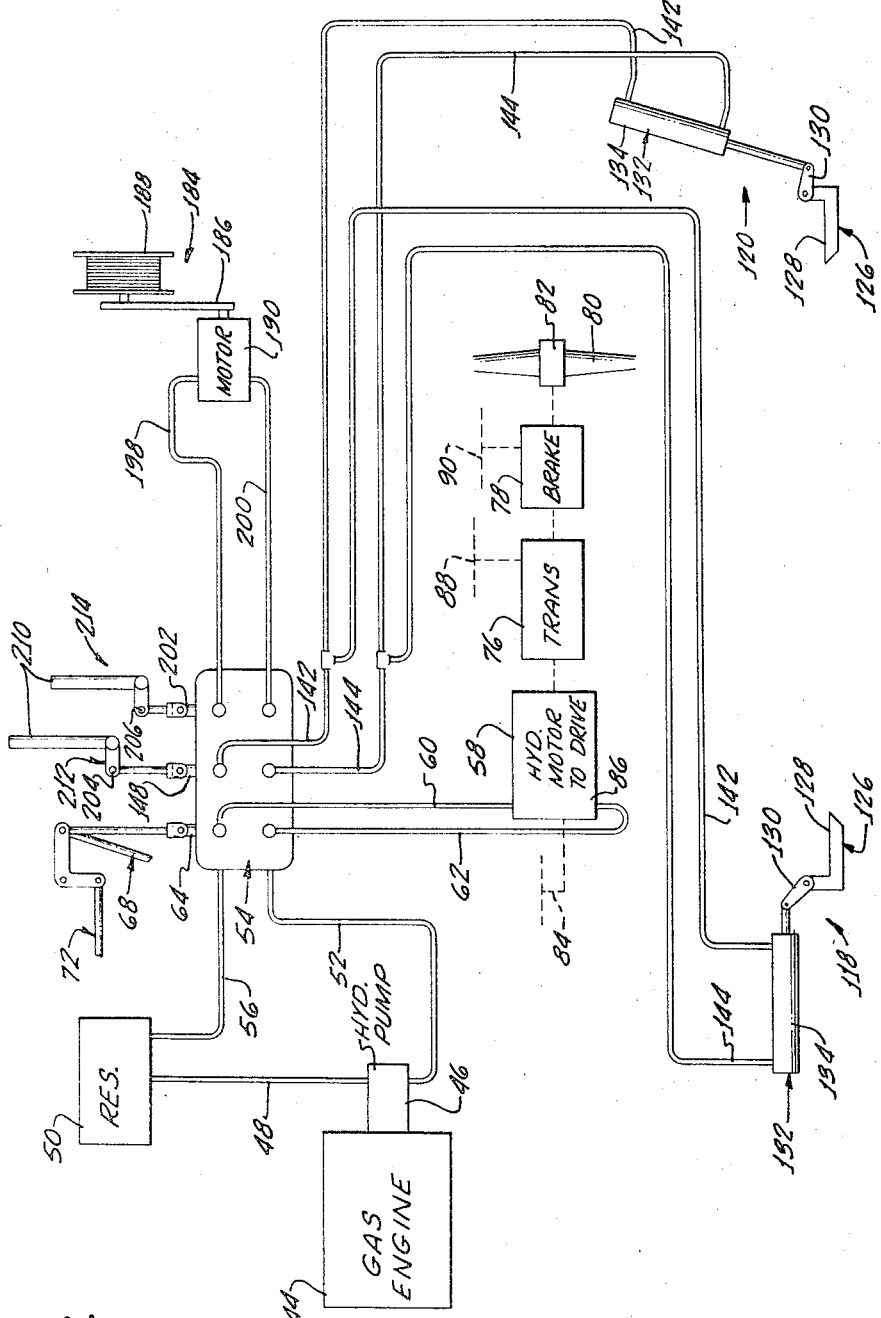

United States Patent Office 3,369,682
Patented Feb. 20, 1968

3,369,682
CARGO HANDLING AND TRANSPORTING
VEHICLE
Ernest R. Breault, 26009 E. 6th St.,
San Bernardino, Calif. 92410
Filed July 6, 1965, Ser. No. 469,468
13 Claims. (Cl. 214—392)

ABSTRACT OF THE DISCLOSURE

A utility pickup vehicle having a driver's cab and steering wheel at each end of the vehicle, and a laterally opening cargo space between the wheels of the vehicle.

---

This invention relates generally to utility vehicles and has more particular reference to a novel, laterally-loading and unloading, cart-handling utility vehicle.

According to one of its important aspects, the invention provides a utility vehicle with a driver's cab at one end, wheels at both ends, and a cargo space between the wheels which opens laterally through at least one side, and preferably through opposite sides of the vehicle, as well as through the underside of the vehicle. Within this cargo space are hoist means for elevating a cargo in the space to a raised position wherein the cargo is supported for transporation by the vehicle. Certain unique and highly important benefits are derived from this vehicle construction. Thus, the present vehicle may be used for cargo handling and transporting service on public thoroughfares as well as in industrial areas. In either case, the cargoes which are required to be handled and transported by a utility pickup vehicle are commonly placed along one side or both sides of the traffic lanes along which the vehicle moves. Accordingly, the most expeditious manner of loading cargo into and unloading cargo from the utility vehicle is to park the vehicle in a position directly opposite the cargo and move the cargo laterally of the traffic lane and the vehicle, from the side of the lane directly into the cargo space of the vehicle. The most expeditious method of unloading the vehicle is to follow the reverse procedure. This method of loading and unloading cargo, for example, is more efficient than loading and unloading the cargo from an end of the vehicle, or maneuvering a pickup vehicle having an end opening cargo space to a position wherein the end opening of the cargo space is aligned with the cargo to be loaded or the space into which the cargo is to be unloaded.

It is apparent that the present utility pickup vehicle with its laterally opening cargo space, is uniquely adapted to utilize the above discussed expeditious method of loading and unloading cargo. Another unique advantage of the present vehicle resides in the fact that a cargo to be loaded may be moved along the ground from the side of the traffic lane, through the side of the vehicle into the cargo space, after which the cargo may be hoisted to an elevated position in the space for transportation by the vehicle. The cargo may be unloaded by a reverse procedure. This eliminates, for example, the necessity of moving the cargo up a ramp onto a bed on the vehicle or, hoisting the cargo onto the bed. This latter hoisting method obviously would require some type of hoist means which could be extended when in use and retracted when in transit. It is significant to note at this point, that one unique and important feature of the invention resides in a cargo transfer means with which the present utility vehicle is equipped for moving a cargo along the ground into the cargo space and subsequently ejecting the cargo along the ground from the space, thereby further facilitating loading and unloading of the present vehicle.

A unique and highly important benefit which derives from the location of the cargo space between the wheels at the ends of the vehicle resides in the fact that these wheels may be supported by conventional axle constructions. Moreover, the drive wheels of the vehicle may be driven through a conventional differential drive mechanism, and the steering wheels may be operated by a conventional steering mechanism. Also, of course, the driver's cab may be located at one end of the vehicle to provide optimum access to and egress from the cab as well as optimum visibility for the vehicle driver. These benefits which are derived from the unique construction of the present utility vehicle are in contrast to a conventional lumber carrier, for example, wherein the cargo space opens through the underside of the carrier, as in the present vehicle, as well as through the front and rear ends of the carrier. This requires location of the driver's cab in a relatively inaccessible and unsafe position on top of the carrier as well as specially designed axial constructions, drive-means, and steering mechanisms for the vehicle wheels.

According to another of its important aspects, the present invention provides a utility pickup vehicle having a driver's cab and steering wheels at each of the vehicle. Accordingly, the vehicle may be driven from either end. This advantage of the present vehicle is important, for example, when the vehicle is required to operate in relatively confined areas, such as industrial areas having relatively narrow traffic lanes, or is employed for certain types of pickup services, such as trash pickup service. Thus, the ability to drive or maneuver the vehicle from either end eliminates the necessity of either backing the vehicle or turning the vehicle around in order to travel in the opposite direction. In the case of industrial use, this capability of the vehicle is of great benefit since, in many cases, it may be impossible for the vehicle to turn around in any confined industrial areas. In certain pickup services, such as trash pickup service, the above discusssed capability of the present utility vehicle is of great importance for the reason that the vehicle is required to operate in populated areas as well as in areas containing large numbers of both moving and stationary vehicles. Thus, in areas of this type, there is always the possibility, with a vehicle which may be driven from one end only of accidentally backing over a pedestrian or child or into a parked vehicle. This possibility is virtually eliminated with the present utility vehicle with its capability of being driven from either end, since the vehicle need never be driven backward relative to the driver's position from which the vehicle is being controlled. Trash pickup vehicles and other similar utility vehicles are also required to operate in relatively confined areas, such as in and out of drive-ways, along relatively narrow dead-end thoroughfares, and the like, wherein it is difficult or impossible to turn the vehicle around. The ability of the present utility vehicle to be manuevered or driven from either end is obviously a decided advantage in these areas.

It is evident from the preceding discussion that the present utility vehicle may be used for a variety of purposes and may be employed to handle a variety of cargoes. However, the vehicle is designed primarily for trash pick-up service. In this connection, a further important aspect of the invention is concerned with the unique construction of the vehicle and a trash receptacle or bin, for use on the vehicle, whereby the latter is uniquely adapted for such trash pickup service and permits a substantial reduction in the time required to service any given trash collection route.

Thus, according to the existing methods of collecting trash, a trash collection vehicle, mounting a permanently attached trash receptacle, travels from one trash collection point to the next along its particular trash collection route. At each collection point, the trash is emptied into the receptacle on the pickup vehicle. When this receptacle is filled to capacity, the vehicle must be driven to a central trash collection area, or dump, wherein the receptacle may be emptied. The vehicle then returns to collect trash from the next leg of its trash collection route. Accordingly, such an existing trash pickup vehicle is periodically removed from service for the length of time required for the vehicle to drive from its collection route to the central trash collection point, or dump, empty its load, and then return to its trash collection route. The total out-of-service time resulting from the several out-of-service periods for each trash vehicle during each pickup day represents a substantial loss in time and money.

According to the present invention, the present utility vehicle is designed to operate as a trash pickup vehicle which travels along an assigned trash pickup route and collects trash from each trash collection point along the route, in the usual way. The trash bin of the vehicle is uniquely constructed to permit trash to be emptied into the bin, at each collection point, from either side of the vehicle. In this way, the trash may be expeditiously collected from one or both sides of the street in minimum time. Additional empty trash bins are placed at preselected intervals along the route in such a way that the present trash pickup vehicle arrives at an empty bin each time the trash bin on the vehicle is filled to capacity. The filled trash bin is then unloaded from the vehicle, the empty trash bin is loaded on the vehicle, and the vehicle continues along the trash collection route. The filled trash bins are emptied into an auxiliary trash collection vehicle which travels along several different routes for this purpose and periodically transports its load of trash to a central collection point, or dump. This method of trash collection results in a substantial saving of time and money.

Accordingly, it is a general object of the present invention to provide an improved and uniquely constructed cargo-handling utility vehicle of the character described.

A more specific object of the invention is to provide a cargo-handling utility vehicle having a centrally located, laterally opening cargo space which permits more expeditious cargo handling operation of the vehicle than existing cargo-handling utility vehicles of this general type.

Another object of the invention is to provide a cargo-handling utility vehicle which may be driven from either end, thereby to uniquely adapt the vehicle for operation in relatively confined industrial and public thoroughfare areas and populated areas wherein the danger exists of striking a pedestrian, child, or vehicle when backing a conventional vehicle, and in other areas when it is difficult, impossible, or dangerous to back a vehicle or turn a vehicle around for traveling in the opposite direction.

Another object of the invention is to provide a cargo-handling utility vehicle which is ideally suited for use as a trash pickup vehicle.

A related object of the invention is to provide a trash pickup vehicle including a trash receptacle or bin which is adapted to receive trash from each side of the vehicle and to be quickly and easily unloaded from the vehicle, when filled to capacity, and replaced by an empty trash bin.

Yet a further object of the invention is to provide a cargo-handling utility vehicle which is relatively simple in construction, economical to manufacture, provides maximum visibility for the driver, or drivers, of the vehicle and is otherwise ideally suited to its intended purposes.

With these and other objects in view, the invention consists in the construction, arrangement, and combination of the various parts of the device, whereby the objects contemplated are attained as hereinafter set forth, pointed out in the appended claims, and illustrated in the accompanying drawings.

In these drawings:

FIGURE 5 is a perspective view of the steering mechanism at one end of the vehicle, this mechanism being typical of the steering mechanism at the other end of the vehicle;

FIGURE 6 is a fragmentary plan view of the central, cargo area of the vehicle illustrating, particularly, certain cargo transfer means which are embodied in the vehicle for transferring a cargo, namely, a trash receptacle, or trash bin into and ejecting the bin from the cargo space of the vehicle, said transfer means being illustrated in the act of transferring a trash bin into the cargo space;

FIGURE 7 is a view similar to FIGURE 6 illustrating the cargo transfer means in the act of ejecting the trash bin from the vehicle;

Figure 1:
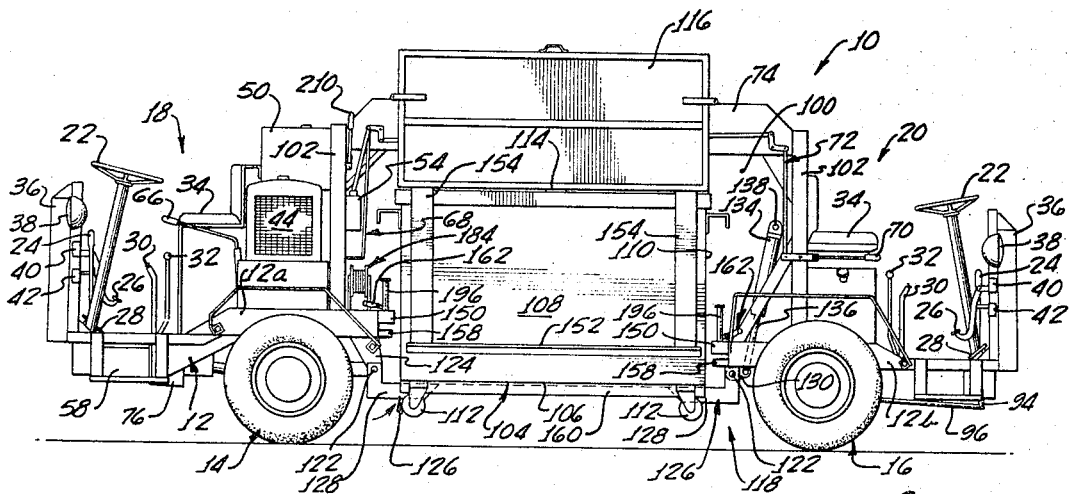
FIGURE 1 is a side elevation of a utility vehicle according to the invention which is particularly designed for use as a trash pickup vehicle.

FIGURE 8 diagrammatically illustrates a hydraulic system embodied in the vehicle.

The utility vehicle 10 illustrated in these drawings is designed for use as a trash collection vehicle and, for this reason, will be hereinafter referred to, in places, as a trash collection vehicle. As noted earlier, however, and as will become evident from the ensuing description, the principal features of the invention may be employed to advantage in utility vehicles for other purposes, Accordingly, while the invention will be hereinafter disclosed primarily in connection with a trash collection vehicle, the invention should not be regarded as limited in usefulness to such a vehicle.

With the foregoing preliminary discussion in mind, the illustrated trash collection vehicle 10 will be seen to comprise a chassis 12 with a first set of wheels 14 at one end and a second set of wheels 16 at the other end. As will be explained shortly, both of these wheel sets comprise steering wheels which may be turned to manuever the vehicle. The vehicle also has a first driver's cab or station 18 at one end and a second driver's cab or station 20 at the other end. Each of these driver's stations includes a steering wheel 22 for steering the adjacent wheels 14 or 16, as the case may be, and a steering lock lever 24 for selectively locking the adjacent wheels in neutral positions wherein the wheel axes are approximately normal to the longitudinal center line of the vehicle. Located at each driver's station is a brake pedal 26, a throttle pedal 28, a hand-brake 30, and a gear-shift lever 32. A seat 34 is provided at each driver's station on which a driver may sit when driving the vehicle. As illustrated particularly in FIGURE 1, seat 34 is positioned below the longitudinal axis of horizontal frame member 74. Rigid on the ends of the vehicle chassis 12 are upstanding, rectangular enclosures 36 which mount the brake pedals 26, enclose master brake cylinders (not shown), and support various other vehicle controls (not shown) which are not pertinent to the invention and, therefore, will not be discussed. Mounted on the located laterally outboard of each enclosure 36 are a pair of headlights 38, a pair of tail-lights 40, and a pair of brake lights 42. Mounted on the inner wall of each enclosure 36 is a light switch (not shown) which may be operated to energize the adjacent headlights and the tail-lights at the opposite end of the vehicle. Thet tail-lights at each end of the vehicle are energized by depression of the brake pedal at the opposite end of the vehicle. It is apparent at this point, therefore, that the trash collection vehicle 10 may be driven from either end. This ability to drive the vehicle from either end has certain unique advantages, and is particularly desirable, if not essential, for optimum trash collection service of the vehicle.

Vehicle 10 is powered by a gasoline engine 44 which is mounted on the chassis 12 just to the rear of the driver's station 18. Referring to FIGURE 8, it will be observed that the engine 44 drives a hydraulic pump 46, the inlet of which is connected, via a hydraulic line 48, to a hydraulic fluid reservoir 50. The outlet of the pump 46 is connected, via a hydraulic line 52, to a valve manifold 54. A return line 56 extends from the manifold back to the reservoir 50. A hydraulic motor 58 is connected to the manifold 54 through hydraulic lines 60 and 62. Included in the manifold is a valve 64 for selectively connecting the motor lines 60, 62 to the high pressure line 52 leading from the pump 46 and to the low pressure line 56. This valve is hereinafter referred to as a motor reversing valve, or simply a motor valve. In one position of the motor valve, high pressure hydraulic fluid from the pump 46 drives the motor 58 in one direction. In the other position of the valve, high pressure fluid from the pump drives the motor in the opposite direction. It is apparent, therefore, that the motor 58 may be selectively driven in either direction of rotation by appropriate positioning of the motor valve 64.

Located at the driver's station 18 is a motor reversing lever 66. This reversing lever is connected through linkage 68 to the motor valve 64. A second reversing lever 70 is located at the driver's station 20. This latter lever is connected to the motor valve 64 through linkage 72 which extends, in part, along an elevated frame member 74 of the vehicle chassis 12. This frame member will be referred to again shortly. Linkages 68 and 72 are so constructed as to permit operation of the motor valve 64, and thereby reversal of the vehicle motor 58, from either driver's station 18 or 20 by movement of the corresponding motor reversing lever 66 or 70.

Motor 58 drives the adjacent vehicle wheels 14 through a drive line including a variable ration transmission 76, a brake 78, and a drive axle 80 containing a differential 82. Throttle pedals 28 are operatively connected, by means 84, to a speed control valve 86 in the motor 58 in such a way as to permit the motor speed to regulate from either driver's station. The variable ratio transmission 76 is operatively connected, by means 88, to the shift valve 32 at the driver's stations so as to permit the ratio of the transmission to be selectively adjusted from either driver's station by appropriate operation of the corresponding shift lever. Finally, brake lever 30 at the driver's stations are operatively connected with the brake 78 by means 90 whereby the brake may be engaged and released from either driver's station. Those portions of the valve operating means 84, transmission operating means 88, and brake operating means 90 which connect to the corresponding controls at the driver's station 20 extend along or through the upper frame members 74 of the vehicle chassis 12. This extension along or through the frame member 74 of the operating means 84, 88, 90, as well as the linkage 72 which connects the motor reversing lever 70 at the driver's station 20 to the motor reversing valve 64, is necessary for reasons which will appear presently.

Reference is now made to FIGURE 5 illustrating a steering mechanism 92 which operatively connects each steering wheel 22 to the adjacent vehicle wheels 14, 16. This steering mechanism comprises a rotary steering arm 94 which is coupled, through gearing (not shown) to the adjacent steering wheel 22, whereby turning of the steering wheel rotates the steering arm in one direction or the other, depending on the direction of rotation of the respective steering wheel. The lower end of the steering arm 94 is connected by linkage 96 to the adjacent vehicle wheels in such a way that rotation of the respective steering wheel in one direction turns the adjacent vehicle wheels in one direction. Rotation of the steering wheel in the opposite direction turns the adjacent vehicle wheels in the reverse direction.

Pivotally mounted on the floor 97 of each driver's station 18 and 20, at the base of the adjacent steering wheel column, is an apertured steering lock bracket 98. This bracket is fixed to the lower end of the adjacent steering lock lever 24, so that the bracket is rotated on its pivot axes by swinging of the lever. Each steering lock bracket is rotatable between its locking position of FIGURE 5 wherein the bracket engages over the upper end of the adjacent steering arm 94 to lock the respective vehicle wheels in their neutral positions wherein the wheel axes are substantially normal to the longitudinal center line of the vehicle and its unlocking position (not shown), wherein the bracket disengages the adjacent steering arm thereby to release the respective vehicle wheels for free steering movement.

It is evident, therefore, that the utility vehicle or trash collection vehicle 10 may be driven from either end. The advantages of this dual vehicle control, particularly those advantages relating to trash collection service of the vehicle will be discussed shortly.

The end portions 12a, 12b, of the chassis 12 overlie the vehicle wheels 14, 16, respectively, and underlie the driver's stations 18, 20, respectively, terminate in spaced relation to define therebetween, and between the vehicle wheels, a cargo space 100. This cargo space opens vertically through the underside of the vehicle and laterally through opposite sides of the vehicle. Rigidly secured to and rising from the adjacent ends of the chassis end portions 12a, 12b are upstanding frame members 102 of the vehicle chassis 12. Each end portion of the chassis mounts a pair of the frame members 102. As may be best observed in FIGURE 3, the frame members 102 of each pair converge toward their upper ends and are rigidly joined at these upper ends to the adjacent end of the elevated, horizontal frame member 74 of the vehicle chassis 12. This horizontal frame member extends over the cargo space 100 in a vertical plane containing the longitudinal center line of the vehicle. At this point, therefore, it is evident that the end portions 12a, 12b of the vehicle chassis 12 are joined solely by the frame member 74.

In the particular utility or trash collection vehicle 10 illustrated in the drawings, the cargo space 100 receives a generally rectangular trash receptacle or bin 104 having a bottom wall 106, upstanding side walls 108, and upstanding end walls 110. Four caster wheels 112 are mounted on the underside of the bottom wall 106, at the four corners, respectively, of the trash bin. The trash bin is open at its top. Pivotally connected, by hinges 114, to the open top of the trash bin, for hinging on axes parallel to and adjacent a vertical plane containing the longitudinal center line of the trash bin, are a pair of trash bin closures 116. These closures are swingable between their upstanding open positions of FIGURE 2 and closed positions (not shown) wherein the closures are horizontally disposed across and close the top opening of the trash bin. Each closure, when in its closed position, covers approximately one half of the open top of the trash bin.

As will appear presently, the trash bin wheels 112 are adapted to support the trash bin 104 on the ground for movement of the bin along the ground laterally into and from the cargo space 100, through the open sides thereof. Mounted on the vehicle chassis 12, at opposite ends of the cargo space, are hoist means 118 and 120, respectively, for elevating the trash bin 104 to a raised position within the cargo space wherein the trash bin is supported for transportation by the trash collection vehicle 10. Hoist means 118 and 120 are generally identical and each comprises a horizontal rock shaft 22 extending transversely of the vehicle chassis 12. The two rock shafts are located below the adjacent ends of the chassis end portions 12a, 12b, respectively, and are rotatably supported in bearing brackets 124 rigidly joined to and depending below the respective chassis end portions. Rigidly fixed to the outboard ends of the rock shafts 122 are trash bins hoist arms 126 having outer trash-bin engaging ends 128. The ends 128 of the two hoist arms 126 on each rock shaft 122 are located in a common plane parallel to and laterally offset from the respective rock shaft. Rigidly fixed at one end to each rock shaft 122, at a position between the ends of the respective shaft, is a torque arm 130.

Each trash bin hoist means 118, 120 further comprise a hydraulic actuator 122 including a cylinder 134 and a piston rod 136 movable in the respective cylinder. The outer end of the piston rod 136 of each actuator is pivotally attached to the outer end of the torque arm 130 of the respective hoist means. The cylinder 134 of each actuator is pivotally attached at 138 to the vehicle chassis 12. Leading from opposite ends of the actuator cylinders are hydraulic lines 142, 144.

The two trash bin hoist means 118, 120 differ in two respects. First, the actuator cylinder 134 of the hoist means 118 is located below and extends generally lengthwise of the end portion 12a of the vehicle chassis 12 and is pivotally attached at 138 to a cross member 146 on the chassis. The actuator cylinder 134 of the hoist means 120, on the other hand, is disposed in a generally upstanding position above the end portion 12b of the chassis and is pivotally attached at 138 to the adjacent upstanding frame members 102 of the chassis. Secondly, the hydraulic lines 142 connect to the front end of the actuator cylinder 134 of hoist means 118 and to the rear end of the actuator cylinder of hoist means 120. Hydraulic line 144, on the other hand, connects to the rear end of the cylinder of hoist means 118 and to the front end of the cylinder of hoist means 120. It is evident, therefore, that pressurizing of the hydraulic lines 142 and venting of the hydraulic line 144 effects retraction of the piston rod 136 into the actuator cylinder 134 of the hoist means 118 and extension of the piston rod from the cylinder of hoist means 120. Conversely, pressurizing of the hydraulic lines 144 and venting of the hydraulic lines 142 effects extension of the piston rod of hoist means 118 and retraction of the piston rod of hoist means 120.

Figure 4:
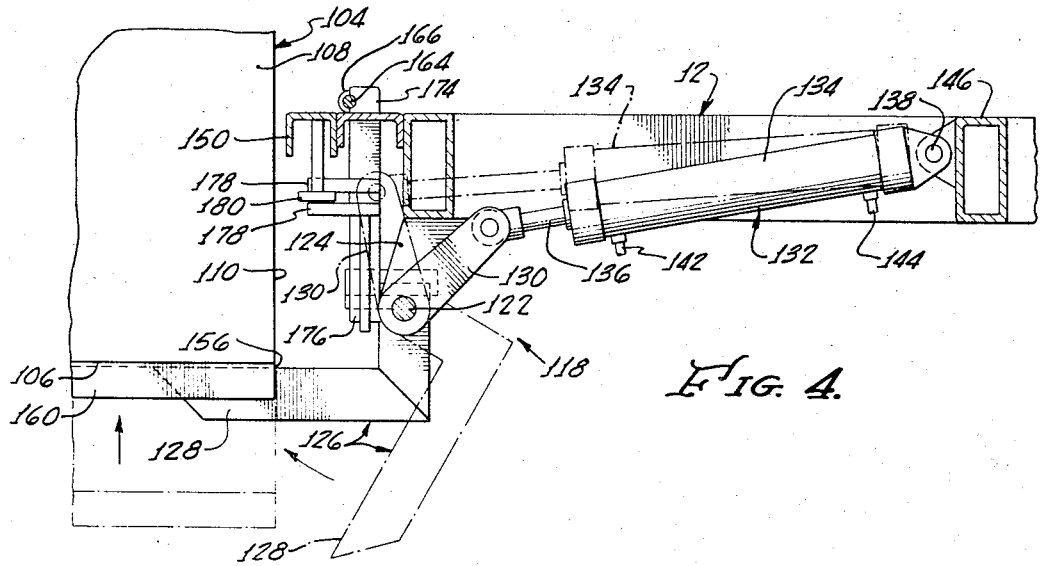
FIGURE 4 is an enlarged section taken on the line 4—4 of FIGURE 3.

Extension of the piston rod 136 from the cylinder 134 of trash bin hoist means 118 rotates the corresponding trash bin hoist arms 126 downwardly and away from the cargo space 100 to the phantom line positions of the arms shown in FIGURE 4. These positions of the arms are hereinafter referred to as their retracted positions. Retraction of the latter piston into its cylinder rotates the corresponding hoist arms upwardly and into the cargo space to the full line positions of the arms shown in FIGURE 4. These latter positions of the hoist arms are hereinafter referred to as their extended positions. The hoist arms 126 of the trash bin hoist means 120 are rotatable between similar extended and retracted positions. In the case of the latter hoist means, however, extension of the piston rod 136 from the cylinder 134 of the hoist means rotates the hoist arms to their extended positions and retraction of the piston rod into the cylinder rotates the arms to their retracted positions. It is evident at this point, therefore, that the trash bin hoist arms 126 of the trash bin hoist means 118, 120 are extended in unison by pressurizing of the hydraulic lines 142 and venting of the hydraulic lines 144. The hoist arms are retracted in unison by pressurizing of the hydraulic lines 144 and venting of the hydraulic lines 142.

Referring to FIGURE 8, it will be observed that the hydraulic lines 142, 144, connect to the valve manifold 154. Included in this manifold is a valve 148 which is operable to selectively connect the hydraulic lines 142, 144 to the high pressure hydraulic line 52 leading from the hydraulic pump 46 and to the low pressure return line 56 leading back to the hydraulic fluid reservoir 50. Thus, the trash bin hoist arms 126 are extended in unison in response to operation of the valve 148 to one position and are retracted in unison in response to operation of the valve 148 to another position. Valve 148 has a closed position wherein the hoist means 118, 120 are hydraulically locked, thereby to permit hydraulic locking of the hoist arms 126 in both their extended and retracted positions. As will be explained shortly, however, the vehicle 10 is equipped with additional mechanical means for locking the hoist arms in their extended positions.

The hoist arms 126, when retracted, clear the cargo space 100 to permit unrestricted lateral movement of the trash bin 104 into and from the space through the open sides thereof. In this regard, it will be recalled that the wheels 112 on the trash bin are adapted to support the latter for movement along the ground into and from the cargo space. Mounted on the end portions, 12a and 12b, of the vehicle chassis 12, at opposite ends, respectively, of the cargo space, are guides 150 with tapered ends to guide the trash bin during its movement into the space. When properly positioned in the cargo space, the sides of the trash bin are generally flush with the sides of the vehicle. It may be desirable, however, to equip the trash bin with steps 152 at the sides thereof on which an operator may stand when emptying trash into the bin. In this case, the steps may project a distance beyond the sides of the vehicle, as shown. Steps 152 may be permanently attached to the trash bin. Preferably, however, the steps are secured to upstanding hook-like brackets 154 which may be hooked over the upper edges of the bin side walls 108 in the manner best illustrated in FIGURE 2, thereby to permit the steps to be removed. In this way, for example, the steps may be transferred to an empty trash bin when the latter is loaded on the trash collection vehicle in place of a full trash bin. This reduces the cost of the trash bins and facilitates emptying of the bins by conventional front-loading trash pickup vehicles.

Figure 2:
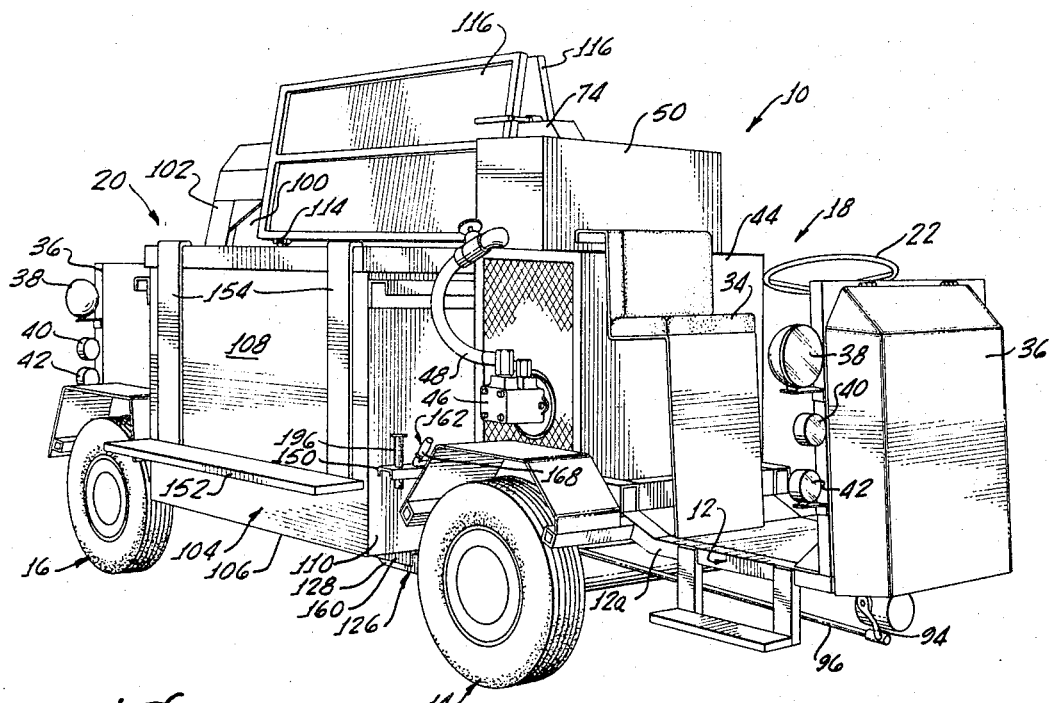
FIGURE 2 is a slightly enlarged perspective view of the trash vehicle in FIGURE 1.

When the trash bin 104 is properly situated within the cargo space 100 the hoist means 118, 120 may be operated to elevate the bin to the raised position of FIGURES 1 and 2, wherein the bin is supported for transportation by the trash collection vehicle 10. In connection with this operation of the hoist means, it is significant to note that the bottom wall 106 of the bin is located a distance above the ground when the bin wheels 112 rest on the ground. This provides a clearance space between the latter bin wall and the ground through which the hoist arms 126 may rotate into supporting engagement with the bin. Thus, when the trash bin 104 is to be transported by the vehicle 10, the hoist arms 126 are extended by operation of the hoist valve 148, in the manner explained earlier. During this extension of the arms, the outer ends 128 thereof engage the lower corner edges 156 of the bin at the juncture of the bottom wall 106 and end walls 110 of the bin, upon rotation of the arms to some intermediate position, wherein the arm ends 128 incline downwardly at an acute angle to their final horizontal extended positions of FIGURE 4. During subsequent rotation of the hoist arms to their extended positions, the arms raise the trash bin off of the ground and elevate the bin to its raised position of FIGURES 1 and 2, wherein the arm ends seat flat against the bottom wall 106 of the bin, as shown best in FIGURE 4. In this raised position, the bin is supported clear of the ground for transportation by the trash collection vehicle 10.

According to the preferred practice of the invention, the trash bin 104 when occupying its raised position for transportation, is restrained against both endwise and lateral movement relative to the vehicle 10. To this end the vehicle is equipped with locators 158 at the ends of the cargo space 100 which are engageable with the bin end walls 110 to locate the trash bin endwise in the cargo space. These locators are preferably tapered as shown, to facilitate entrance of the bin into the space between the locators. The trash bin is restrained against lateral movement within the cargo space by welding or otherwise rigidly securing downwardly opening channels 160 to the bottom wall 106 of the bin to receive the ends 128 of the hoist arms 126 when the latter are extended to elevate the bin.

Figure 3:
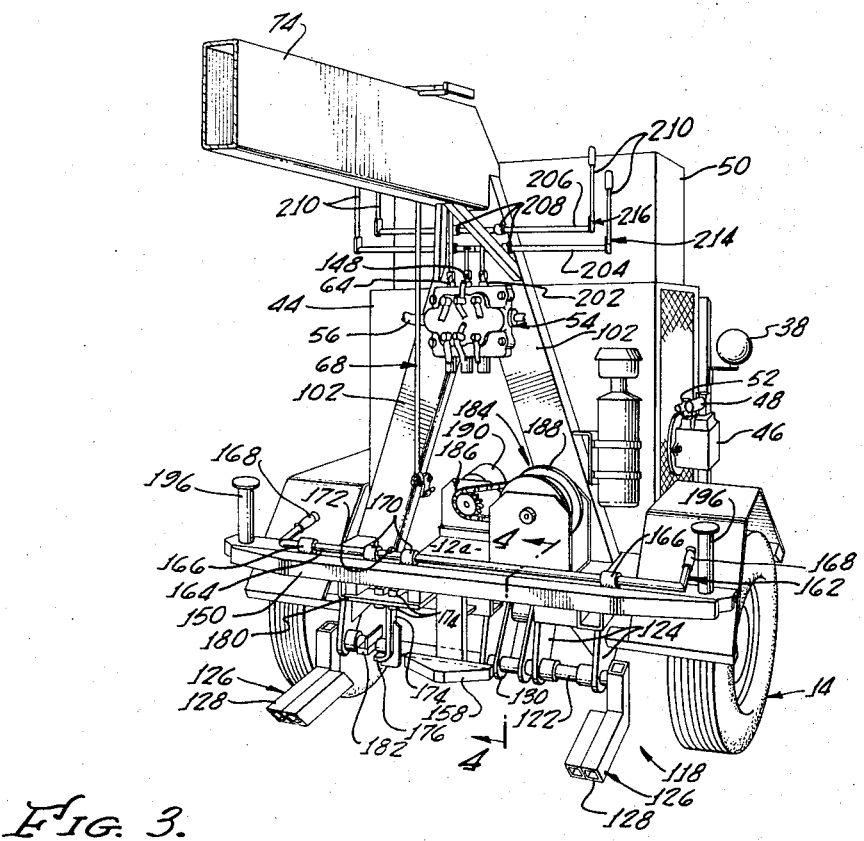
FIGURE 3 is a fragmentary perspective view of one end of the vehicle looking at the same from within the cargo space of the vehicle.

While the hoist valve 148 may be operated to hydraulically lock the hoist arms 126 in their elevated positions, as noted earlier, it is desirable to mechanically lock the arms in their elevated positions when the arms support the trash bin 104 in its elevated position within the cargo space 100 thus to remove the weight of the trash bin and its contents from the hydraulic system of the trash bin hoist means, 118, 120. To this end, the trash collection vehicle 10 is equipped with a latch means 162 for the hoist arms 126 of each hoist means 118, 120. Since the two latch means 162 on the vehicle are identical, only one latch means has been illustrated in detail, namely the latch means associated with the trash bin hoist means 118 and illustrated in FIGURE 3. It will be understood, therefore, that the following description of the illustrated latch means will apply, as well, to the latch means for the other trash bin hoist means 120. Referring to FIGURE 3, the illustrated latch means 162 will be seen to comprise a horizontal latch operating rod 164 which extends crosswise of the vehicle 10, along the upper surface of the adjacent trash bin guide 150. Rigidly secured to this guide are a pair of bearings 166 which slidably and rotatably receive the rod. The ends of the rod are turned at right angles and mount hand grips as shown to form handles 168 on the rod which are accessible from both sides of the vehicle. Fixed to the rod 164, at a position between the rod bearings 166, are a pair of axially spaced thrust sleeves 170. Slidable and rotatable on the rod between these sleeves is a third thrust sleeve 172. Thrust sleeve 172 is rigidly joined to the upper end of a vertical latch arm 174. The lower end of this latch arm is located at the approximate level of the adjacent hoist means rock shaft 122 and is turned at right angles to form a thrust shoulder 176 which extends axially of the shaft. Rigidly fixed to the latch arm 174, intermediate its upper and lower ends, are a pair of horizontal vertically spaced plates 178. These plates straddle a horizontal guide plate 180 rigidly mounted on the underside of the trash bin guide 150. At this point, therefore, it is evident that axial movement of the latch operating rod 164 is effective to move the latch shoulder 176 on the lower end of the latch arm 174 axially of the adjacent rock shaft 122. The rod is free to rotate relative to the latch arm.

Rigidly fixed to the rock shaft 122, at the side of the latch arm 174 toward which the latch shoulder 176 extends, is a generally radial stop 182. When the rock shaft 122 is rotated to the position wherein the corresponding trash bin hoist arms 126 occupy their extended positions, this stop is generally horizontal and disposed to receive thereunder the latch shoulder 176. It is now evident, therefore, that when the hoist arms 126 are extended, the latch operating rod 164 may be shifted axially to the left in FIGURE 3 to engage the latch shoulder 176 under the rock shaft stop 182 and thereby latch or lock the hoist arms in their extended positions. The latch shoulder 176 may be retracted out of latching engagement with the stop 182, to release the hoist arm 126 for rotation to their retracted positions, by axially shifting the latch operating rod 164 to the right in FIGURE 3. The rod may obviously be shifted from either side of the vehicle. For reasons which will appear presently, the rod 164 is normally rotated to the position of FIGURE 3 wherein the rod handles 168 lie generally horizontal.

In order to facilitate lateral movement of the trash bin 104 into and from the cargo space 100, the trash collection vehicle 10 is equipped with a trash bin transfer means 184 for driving the trash bin into and ejecting the trash bin from this space. This transfer means comprises a winch 186 including a cable drum 188 driven by a hydraulic motor 190. Winch 184 is mounted on the end portion 12a of the vehicle chassis 12, between the adjacent upright frame members 102 of the chassis and the adjacent trash bin guide 150. A cable 192 is wound on and secured at one end to the cable drum 188. The other end of the cable 192 has a loop 194. Rigidly secured to a rising from the ends of the cable guides 150 are upstanding posts 196 above which the cable 192 is adapted to be trained, in a manner hereinafter explained.

Referring to FIGURE 8 it will be observed that the hydraulic winch motor 190 is connected, by hydraulic lines 198 and 200 to the valve manifold 54. This manifold includes a valve 202 which may be operated to selectively connect the hydraulic line 198, 200 to the high pressure hydraulic line 52 leading from the hydraulic pump 46 and to the low pressure return line 56 leading back to the hydraulic fluid reservoir 50. Thus the winch motor 190 may be hydraulically powered to drive the winch drum 188 in either direction of rotation by appropriate positioning of the winch valve 202. Valve 202 has a closed position wherein the motor 190 remains inoperative.

FIGURE 6 illustrates the manner in which the trash bin transfer means 184 operates to drive the trash bin 104 laterally into the cargo space 100 of the vehicle 10 through one open side of the space. FIGURE 7 illustrates the manner in which the transfer means operates to eject the trash bin from the cargo space through the opposite open side thereof. When the trash bin 104 is to be driven into the cargo space 100, the winch cable 192 is trained about the lower cable post 196, in FIGURE 6, adjacent the winch 186, and then around the upper side of the trash bin 104, as the latter is viewed in FIGURE 6, in such manner that the cable passes around the outside of the two upper cable posts in FIGURE 6. The loop 194 on the end of the cable is placed over the remaining lower cable post 196 in FIGURE 6. The winch motor 190 is now operated to drive the cable drum 188 in a direction to wind the winch cable 192 thereon. As the cable winds on the drum, the cable, in effect, pulls the trash bin 104 into the cargo space 100 to a position wherein the run of the cable extending between the two upper cable posts 196 in FIGURE 6 stretches taut. This locates the trash bin in the proper position within the cargo space for engagement by the hoist arms 126 of the trash bin hoist means 118, 120. Accordingly, after the cable is removed from the trash bin, the hoist means may be operated to elevate the trash bin to its raised position in FIGURES 1 and 2 for transportation by the vehicle 10.

When the trash bin 104 is to be ejected from the cargo space 100, the trash bin hoist means 118, 120 are retracted to lower the trash bin to the ground. Thereafter, the winch cable 192 is trained about the lower cable post 196, in FIGURE 7 adjacent the winch 186, and then about the upper side of the trash bin, as the latter is viewed in FIGURE 7. The loop 194 is placed over the remaining lower cable post in FIGURE 7, as before. In this case, the cable does not pass about the two upper cable posts in FIGURE 7. The winch motor 190 is now operated to rotate the cable drum 188 in a direction to wind the cable 192 thereon, as before. As the cable winds on the drum, it ejects the trash bin from the cargo space to a position wherein the run of the cable extending between the two lower cable posts in FIGURE 7 stretched taut.

It is evident at this point, therefore, that operation of the trash bin transfer means 184 in the manner explained above is effective to drive the trash bin 104 laterally into the cargo space 100 of the vehicle 10 through one open side of this space and to eject the trash bin laterally from the space through the opposite open side thereof. It is significant to note that when the trash bin is driven into the cargo space, it is not essential that the trash bin be initially aligned with the cargo space. In other words, if the trash bin is off-set lengthwise of the cargo space, the winch cable 192 will tend to draw the trash bin into lateral alignment with cargo space. However, if the misalignment of the trash bin is substantial, it may be desirable to initially train the cable about the inner side of the upper cable post, in FIGURE 6, toward which the bin is off-set until the bin has been drawn into substantial alignment with the cargo space. The cable can be then returned to its normal position on the outside of the post during the remaining operation of the transfer means 184 to drive the trash bin to its final position within the cargo space.

It is evident that the trash bin transfer means 184 may be operated in other ways than that described above. For example, it is apparent that the winch cable 192 may be trained about the trash bin 104 and the cable post 196 in such a way as to drive the trash bin into the cargo space through the lower side of the vehicle in FIGURE 6 and to eject the trash bin from the cargo space through the upper side of the vehicle in FIGURE 7. Alternatively, the cable may be trained about the trash bin and cable posts in such a way as to drive the trash bin into the cargo space from either side of the vehicle and to eject the trash bin from the cargo space through the same side of the vehicle.

Referring now again to FIGURE 3, it will be observed that the valve manifold 54 is mounted on the two upright frame members 102 which rise from the end 12a of the vehicle chassis. As has already been described, the motor reversing valve 64 on the valve manifold is operated by the motor reversing levers 66 and 70 at the driver's stations 18 and 20, respectively, through linkages 68 and 72. Located over the valve manifold 54 are a pair of horizontal valve operating rods 204 and 206 which extend crosswise of the vehicle 10 and are journaled in bearing sleeves 208 secured to the adjacent frame members 102. The outboard ends of these rods mount handles 210 by which the rods may be rotated. Rod 204 is operatively connected, by linkage 212, to the hoist valve 148 in such manner that rotation of the latter rod is effective to operate the valve for extending and retracting the trash bin hoist arms 126, in the manner explained earlier. Similarly, rod 206 is operatively connected, by linkage 214, to the winch valve 202 in such a way that rotation of the latter rod is effective to operate the winch valve for operating the trash bin transfer means 184, in the manner explained earlier.

The illustrated trash collection vehicle 10 is designed for operation by two operators. While the vehicle is in transit, these operators will normally be located at the driver's stations 18 and 20, whereby either driver can control the vehicle. Accordingly, the vehicle may always be controlled by the driver who is situated at the front end of the vehicle, with respect to its direction of motion, whereby the driver currently in control of the vehicle always has a clear field of view of the area ahead of the vehicle, with respect to its direction of motion. As a consequence, the necessity of "backing" the vehicle and the dangers attendant to such backing motion, i.e. running into another vehicle or running over a pedestrian or child, are eliminated. Moreover, this dual control capability of the present vehicle completely eliminates the necessity of turning the vehicle around and thereby uniquely adapts the vehicle for operation in confined areas, such as industrial areas, relatively narrow dead-end public thoroughfares, and private drive-ways. In this regard, it is significant to note that the present trash collection vehicle may be driven into and out of private drive-ways in minimum time and with minimum effort. This would permit the operator's of the vehicle to offer an ideal trash collection service, wherein the trash would be collected, by the vehicle operators directly from the normal trash collection area of each house along the trash collection route, thereby eliminating the necessity for each home owner to cart his trash to the street. In addition, the dual control capability of the vehicle substantially reduces the overall time required to service a given trash collection route and, as a consequence, permits a substantially greater number of trash collection points to be serviced in a given period of time.

Normally, the closures, or covers, 116 of the trash bin 104 are retained in their upright, open positions of FIGURES 1 and 2 as the trash collection vehicle 10 proceeds along its trash collection route. In these open positions, the covers rest against sides of the intervening, elevated frame member 74 of the vehicle chassis 12. Preferably, this frame member mounts pivoted latches 216 for releasably latching the covers in their open positions. At each trash collection point along the route, the vehicle is halted and the operators gather the trash in the immediate vicinity and empty the trash into the trash bin 104. It is significant to note that trash may be emptied into the trash bin from either side of the vehicle. Accordingly, trash may be collected simultaneously from both sides of a street as the vehicle proceeds along the street. This, of course, results in a substantial saving of time and effort required to service a given trash collection route. When the trash bin 104 is finally filled to capacity, it is ejected from the cargo area 100 of the vehicle 10 and replaced by an empty trash bin. In this connection, reference is again made to the earlier discussion, wherein it was noted that a number of empty trash bins 104 may be deposited at preselected locations along the trash collection route serviced by the vehicle. These locations are selected so that the vehicle arrives at an empty trash bin whenever the trash bin currently on the vehicle is about filled to capacity. Accordingly, upon arriving at each empty trash bin, the vehicle operators eject the filled trash bin currently on the vehicle and load onto the vehicle the adjacent empty trash bin. The vehicle then proceeds along the next leg of its trash collection route. The trash is collected from the filled trash bins deposited along the route by a conventional front loading trash pickup vehicle or the like, which carries the trash to a central trash collection area, or dump.

As noted earlier, this unique method of handling trash which is permitted by the unique construction of the present trash collection vehicle 10, eliminates the necessity of employing the vehicle to periodically transport the collected trash to the central trash collection area or dump, as is necessary with conventional trash collection vehicles. This, in turn, permits the present vehicle to service a substantially larger number of trash collection points than a conventional trash collection vehicle.

It is apparent at this point, therefore, that the utility vehicle illustrated in the drawings is uniquely constructed and arranged for use as a trash collection vehicle. It is further apparent, however, that the vehicle may be used for other purposes. For example, the trash bin 104 may be replaced by a palletized cargo which may be supported by the hoist means 118, 120 in much the same manner as the trash bin 104. The pallet of such a cargo may be equipped with wheels or other ground engaging means to permit the cargo to be driven into and ejected from the cargo space 100 of the vehicle in the same manner as described earlier in connection with the trash bin. Similarly, the vehicle may be used to handle and transport other types of cargo, such as large containers, and the like.

Accordingly, while the invention has herein been shown and described in what is presently conceived to be its most practical and preferred embodiment, it is to be recognized that departures may be made therefrom within the scope of the invention, which is not to be limited to the details disclosed herein, but is to be accorded the full scope of the claims so as to embrace any and all equivalent devices.

Having described the invention, what is claimed as new in support of Letters Patent is:

1. In combination: a trash receiving bin and a pickup vehicle for transporting said bin, said vehicle having a cargo space which opens laterally of the vehicle and vertically through the underside of said vehicle, said trash bin having an open top and comprising lower ground engaging wheels to movably support said bin on the ground for lateral movement into and from said cargo space through an open side of said space, hoist means on said vehicle for selectively elevating said trash bin in said cargo space to a raised position wherein said bin is supported for transportation by said vehicle and lowering said bin in said space to a position wherein said bin wheels rest on the ground and said hoist means are disengaged from said bin to permit lateral movement of said bin from said space through an open side thereof, and the open top of said trash bin being exposed at opposite sides of said vehicle when said bin occupies said raised position, thereby to permit trash to be emptied into said bin from either side of said vehicle.

2. The combination according to claim 1 wherein: said vehicle comprises a chassis including opposite end portions located at opposite ends, respectively, of said cargo space and a single longitudinal frame member extending over said cargo space between and interconnecting said chassis end portions, said frame member being centrally located between the sides of said vehicle, whereby the open top of said trash bin is exposed at opposite sides of said frame member when said trash bin occupies said raised position in said cargo space, and a pair of ground engaging wheels mounted on each of said chassis end portions.

3. The combination according to claim 1 wherein: said vehicle comprises a chassis including opposite end portions located at opposite ends, respectively, of said cargo space and a single longitudinal frame member extending over said cargo space between and interconnecting said end portions, said frame member being located midway between the sides of said vehicle, whereby the open top of said trash bin is exposed at opposite sides of said frame member when said bin occupies said raised position in said cargo space, and a pair of ground engaging wheels mounted on each of said chassis end portions, and said trash bin comprises a pair of hinged covers for closing the open top of said trash bin, said covers being hinged to said bin on axes adjacent and parallel to a vertical plane containing the longitudinal center line of said trash bin and being swingable between generally horizontal closed positions wherein said covers close the open top of said bin and upright open positions wherein said covers rest against opposite sides of said frame member when said trash bin occupies said raised position in said cargo space, and means on said frame member for releasably latching said trash bin covers in their open positions.

4. The combination according to claim 1 including: trash bin transfer means on said vehicle releasably engageable with said trash bin for driving the bin laterally into and ejecting the bin laterally from said cargo space.

5. In combination: a trash receiving bin and a trash collector vehicle for transporting said bin, said vehicle comprising a chassis including longitudinally spaced end portions defining therebetween a cargo space opening laterally through opposite sides of the vehicle and a single longitudinal frame member extending over said cargo space between and interconnecting said end portions, said frame member being located midway between the sides of said vehicle, and a pair of ground engaging wheels on each of said chassis end portions, said trash bin having an open top and comprising lower ground engaging wheels to movably support said bin on the ground for lateral movement into and from said cargo space through an open side of said space, lower downwardly presented supporting surfaces excessible at the ends, respectively, of said bin, and covers hingeably connected to the open top of said trash bin on hinging axes adjacent and parallel to a plane containing the longitudinal center line of said trash bin for swinging movement of said covers between horizontal closed positions wherein said covers close the open top of said trash bin and upright open positions, first and second hoist means mounted on said chassis end portions at opposite ends, respectively, of said cargo space for selectively elevating said trash bin in said space to a raised position wherein said bin is supported for transportation by said vehicle and lowering said trash bin in said space to a position wherein said vehicle wheels rest on the ground and said hoist means are disengaged from said bin to permit lateral movement of said bin from said space through an open side thereof, means for operating said first and second hoist means in unison, said vehicle frame member being disposed to support said covers in their open positions when said trash bin occupies said raised position in said cargo space, and latch means on said frame member for releasably latching said covers in their open positions.

6. The combination according to claim 5 wherein: the wheels of each of said vehicle wheel pairs comprise steering wheels and said vehicle comprises propulsion means for propelling said vehicle in either longitudinal direction, and a driver's station on each of said chassis end portions including means for steering the adjacent vehicle wheels, means for selectively locking the adjacent vehicle wheels in neutral positions wherein the wheel axes extend substantially normal to the longitudinal center line of said vehicle, and means for controlling said vehicle propulsion means to effect controlled motion of said vehicle in either longitudinal direction.

7. The combination according to claim 5 including: trash bin transfer means on said vehicle for driving said trash bin laterally into and ejecting said trash bin laterally from said cargo space.

8. A cargo handling and transporting utility vehicle, comprising: a chassis including spaced end portions defining therebetween a cargo space which opens laterally through opposite sides of said vehicle and vertically through the underside of said vehicle, and a horizontal frame member extending over said cargo space, said frame member being rigidly joined at its respective ends to the adjacent said end portions, a pair of ground engaging steering wheels mounted on each of said chassis end portions, propulsion means mounted on one of said chassis end portions and drivably coupled to the adjacent wheels for propelling said vehicle in either longitudinal direction, a driver's station at each of said chassis end portions including means for steering the adjacent vehicle wheels and means for controlling said propulsion means to effect controlled motion of said vehicle in either longitudinal direction, each of the driver's seats at said driver's stations being positioned below the longitudinal axis of said frame member, first and second hoist means mounted on said chassis end portions at opposite ends, respectively, of said cargo space for elevating a cargo in said space to a raised position wherein said cargo is disposed for transportation by said vehicle and lowering said cargo in said space to a position wherein said cargo rests on the ground and said hoist means are disengaged from said cargo to release the latter from lateral movement from said cargo space through an open side thereof, and means for operating said first and second hoist means in unison.

9. A vehicle according to claim 8 including: transfer means on said vehicle within said cargo space for laterally driving a cargo into and laterally ejecting a cargo from said cargo space through an open side thereof.

10. A cargo handling and transporting utility vehicle, comprising: a chassis including spaced end portions defining therebetween a cargo space and a single longitudinal frame member extending over said cargo space between and interconnecting said end portions, said cargo space opening laterally through opposite sides of said vehicle and vertically through the underside of said vehicle, a pair of steering wheels mounted on each of said chassis end portions, vehicle propulsion means mounted on one of said chassis end portions and drivably coupled to the adjacent vehicle wheels for propelling said vehicle in either longitudinal direction, a driver's station on each of said chassis end portions including means for steering the adjacent vehicle wheels, means for selectively locking the adjacent vehicle wheels in neutral positions wherein the wheel axes extend substantially normal to the longitudinal center line of said vehicle, and means for controlling said vehicle propulsion means to effect controlled motion of said vehicle in either longitudinal direction, each of the driver's seats at said driver's stations being positioned below the longitudinal axis of said frame member, first and second hoist means mounted on said chassis end portions at opposite ends, respectively, of said cargo space for elevating a cargo in said space to a raised position wherein said cargo is disposed for transportation by said vehicle and lowering said cargo in said space to a position wherein said cargo rests on the ground, and means for operating said hoist means in unison.

11. A vehicle according to claim 10 wherein: said propulsion means comprises a hydraulic propulsion motor, a gasoline engine, and means for supplying hydraulic fluid under pressure to said motor including a hydraulic pump driven by said engine, and said hoist operating means comprise hydraulic motors for said first and second hoist means respectively, and means including said pump for supplying hydraulic fluid under pressure to said latter motors.

12. A cargo handling and transporting vehicle comprising: a vehicle chassis including spaced end portions defining therebtween a cargo space and a single longitudinal frame member extending over said cargo space between and rigidly interconnecting said end portions, whereby said cargo space opens laterally through opposite sides of said vehicle and vertically through the underside of said vehicle, a pair of ground engaging steering wheels mounted on each of said chassis end portions, vehicle propulsion means mounted on one of said chassis end portions and drivably coupled to the adjacent vehicle wheels for propelling said vehicle in either longitudinal direction, and a driver's station on each of said chassis end portions including means for steering the adjacent wheels in neutral positions wherein the wheel axes extend substantially normal to the longitudinal center line of said vehicle, and means for controlling said propulsion means to effect controlled motion of said vehicle in either longitudinal direction, each of the driver's seats at said driver's stations being positioned below the longitudinal axis of said frame member.

13. In combination: a cargo container and a vehicle for transporting said container, said vehicle having a cargo space which opens laterally of said vehicle and vertically through the underside of said vehicle, said container and vehicle being relatively laterally movable between unloaded positions wherein said container is located at one side of said vehicle opposite an open side of said cargo space and loading positions wherein said container is located within said space in such manner that the relative lateral movement of said container with respect to said vehicle occurs through an open side of said space, hoist means on said vehicle within said cargo space for selectively elevating said container in said space to a raised position wherein said container is supported for transportation by said vehicle and lowering said container in said space to a position wherein said container rests on the ground and said hoist means are disengaged from said container to permit relative lateral movement of said container and vehicle to said unloaded positions in such a manner that the relative movement of said container occurs through an open side of said cargo space, and a winch on said vehicle at one end of said cargo space having a cable drum, a cable attached at one end to said drum, a pair of cable guides mounted on said vehicle at each end of said cargo space adjacent the open sides, respectively, of said space, means on the opposite end of said cable for releasable attachment to one of said guides at the end of said cargo space remote from said winch, and said cable being adapted to be trained about said container and guides in such manner as to permit said container to be driven laterally into and from said cargo space by operation of said winch.

References Cited
UNITED STATES PATENTS

| | | | |
|---|---|---|---|
| 2,146,436 | 2/1939 | Lima | 214—517 |
| 2,410,965 | 11/1946 | Dimick | 214—392 |
| 2,948,427 | 8/1960 | Claas | 214—515 |
| 3,028,030 | 4/1962 | Wylie | 214—396 |
| 3,149,739 | 9/1964 | Brown | 214—517 |
| 3,197,229 | 7/1965 | Houlton | 214—394 |
| 3,305,116 | 2/1967 | McKee | 214—392 |

GERALD M. FORLENZA, *Primary Examiner.*

ALBERT J. MAKAY, *Examiner.*